July 14, 1931. R. C. SHELDON 1,814,972
PORTABLE STALL GATE
Filed May 28, 1929
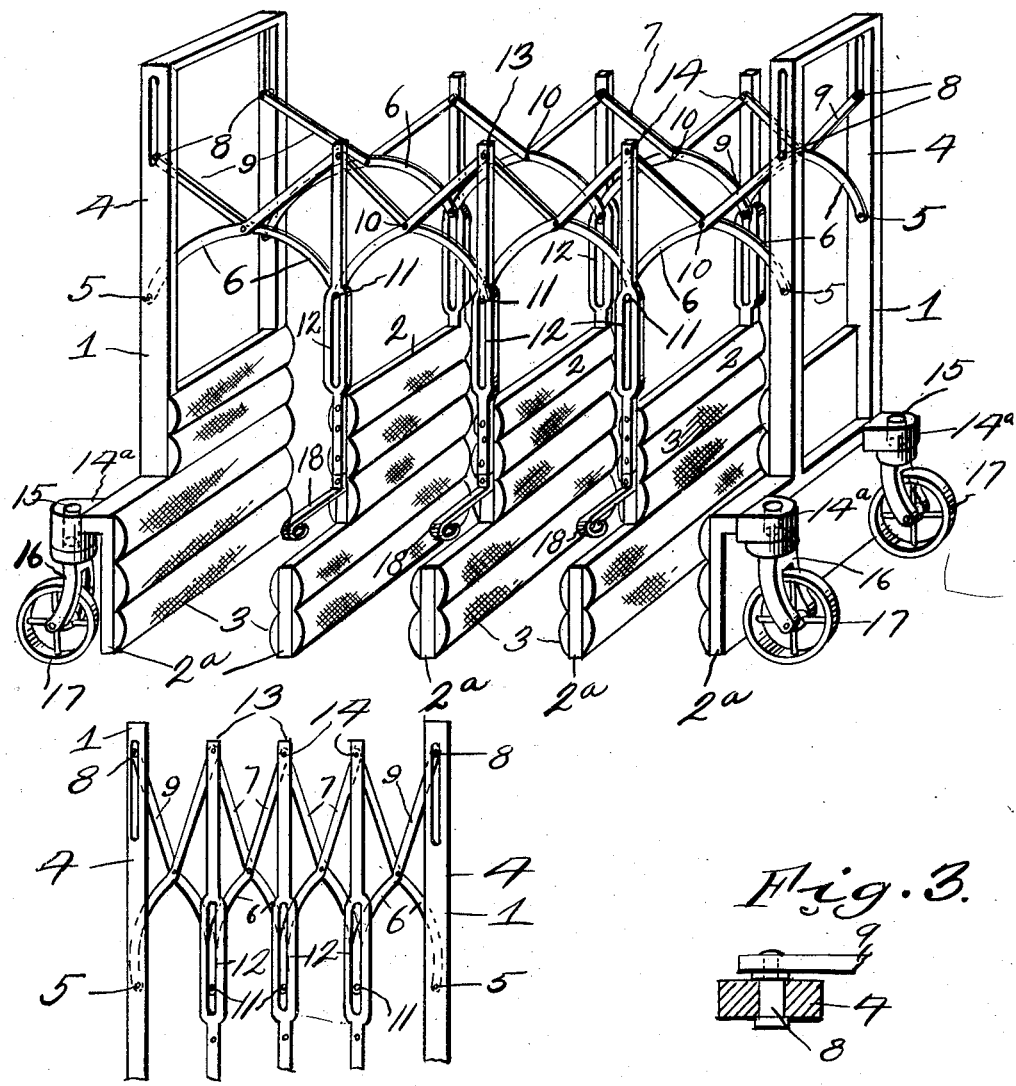
INVENTOR.
R. C. Sheldon
BY
ATTORNEY.

Patented July 14, 1931

1,814,972

UNITED STATES PATENT OFFICE

RAYMOND C. SHELDON, OF OMAHA, NEBRASKA

PORTABLE STALL GATE

Application filed May 28, 1929. Serial No. 366,660.

The invention relates to starting stall gates used in connection with race tracks, and has for its object to provide a device of this character which may be easily transported from place to place, for instance from one track to another, and when not in use may be easily folded into a compact package for shipment and storage purposes.

A further object is to provide a portable folding stall member having a plurality of vertical walls in parallel relation and provided with lazy tong connections whereby the walls may be adjusted towards and away from each other, also to provide supporting caster wheels carried by the end walls of the device and adapted to support the device when extended or collapsed, and forming means whereby the device may be easily and quickly placed on the track or moved therefrom with the minimum amount of labor and time.

A further object is to provide a stall gate having a plurality of stalls in which the various animals are placed for preventing crowding or interference of the animals with each other, either intentional or otherwise, as well as between the riders, thereby insuring a substantially instantaneous starting of the animals, also to construct the device so that horses may pass through the stalls from the rear of the device, thereby obtaining the advantage of what is known as a "walking up start" from the rear, and obviating the necessity of backing them into the stalls.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of the device showing the same extended.

Figure 2 is a front elevation of the device showing the same partially collapsed.

Figure 3 is a detail sectional view through the slidable pivotal connection between one end of the lazy tong members and the end partition or wall.

Referring to the drawings, the numeral 1 designates the end walls of the stall and 2 the intermediate walls which are in parallel relation with each other and the end walls. The inner sides of the end walls 1 and the opposite sides of the intermediate walls 2 are provided with padding 3 for preventing injury to the animals or the riders thereof, incident to rubbing of the animals against the walls in the excitement and consequent movement of the animals. Extending upwardly from the upper ends of the end walls 1 are U-shaped frames 4 to which are pivotally connected at 5 the curved portions 6 of the lazy tong arms 7, and also slidably connected at 8 as well as pivotally are the other arms 9 of the lazy tong which arms are in crossed relation for pivotal connection at 10 and have their curved portions 6 curving downwardly in opposite directions, thereby forming an arch which would be located above the heads of the riders so they would not interfere with the passage of the animals and riders into the various stalls from either direction. The adjacent lower ends of the curved portions 6 of the lazy tong arms are pivotally connected together at 11 and slidably connected in vertical elongated slots 12 of the vertical supporting arms 13 which extend upwardly and are pivotally connected at 14 to the upper pivotally connected ends of the lazy tong arms 7. Therefore it will be seen that the stall walls are supported and when the end walls 1 are forced towards or away from each other, the distances between the stall walls may be varied for properly providing stalls or for collapsing the device into a compact package for storage purposes, or for moving the same onto or off the track.

Extending outwardly from the outer sides of the end walls 1 adjacent their lower ends are brackets 14a in which are mounted the pintles 15 of the caster wheel brackets 16, in which are rotatably mounted the caster wheels 17 which engage the ground, and positioned whereby the lower ends of the walls 1 and 2 will be supported spaced from the ground for allowing the device to be easily collapsed or extended. It will be noted that both ends of the stall are open, therefore it will be seen that race horses may have what is known as a "walking up start" to the starting line, and it will not be necessary to back them into the starting stalls which confuses the animals and excites them.

The lower ends of the walls 2 are provided with extension members 2a, thereby giving the advantages of a relatively long wall for the animal without using this extreme length of wall to the height of the rider's head which would add a great deal of weight to the device as a whole. To prevent danger of the animal getting its legs or any part of its body over the extension members 2a, the walls are provided with outwardly extending yieldable members 18 in the plane of the extensions, which may be formed from any material desired.

From the above it will be seen that a portable collapsible starting device having a plurality of stalls is provided, which device is simple in construction, may be easily and quickly moved to a position on the track in a collapsed condition and then extended for use, and after use may be quickly collapsed and moved on its supporting wheels from the track, or to another track if desired.

The invention having been set forth what is claimed as new and useful is:—

A portable stall comprising a plurality of vertically disposed walls comprising end and intermediate walls, the end walls having upwardly extending U-shaped frames, lazy tong connections between said U-shaped frames, upwardly extending arms carried by the intermediate walls and connected to the lazy tong connection and supported thereby whereby upon movement of the end walls towards or away from each other all of the walls will move in parallel relation and ground engaging wheels carried by the end walls and forming means for supporting all the walls spaced from the ground.

In testimony whereof I hereunto affix my signature.

RAYMOND C. SHELDON.